United States Patent

[11] 3,560,774

[72] Inventor Raymond R. Reeves
 33 Grove Park, London SE. 5 England
[21] Appl No 783,789
[22] Filed Dec. 16, 1968
[45] Patented Feb. 2, 1971

[54] ROTARY STEPPING MOTOR WITH ECCENTRIC ROTOR
 17 Claims, 7 Drawing Figs.
[52] U.S. Cl. ................................................ 310/49,
 310/67, 310/75, 310/80, 318/138
[51] Int. Cl. ................................................ H02k 29/02,
 H02k 37/00
[50] Field of Search ........................................ 310/49, 75,
 67, 75(.4), 80, 82, 83, 46, 181

[56] References Cited
UNITED STATES PATENTS
3,290,572 12/1966 Hartmann et al. ............ 318/138
3,456,139 7/1969 Newell ........................ 310/49
1,517,285 12/1924 Fischedick et al. ............ 310/75X(.4)
2,677,090 4/1954 Fleming-Williams et al. 310/49X
2,844,316 7/1958 Liebknecht ................... 310/49X
2,857,536 10/1958 Light ........................... 310/82
3,240,964 3/1966 Grant .......................... 310/49
3,322,984 5/1967 Anderson .................... 310/82
3,331,974 7/1967 Proctor ........................ 310/49
3,452,227 6/1969 Welch ......................... 310/82

Primary Examiner—W. E. Ray
Attorney—Baldwin, Wight, & Brown

ABSTRACT: An electric stepping motor comprising a stator with three or more circumferentially displaced poles and provided with a rotor (inside or outside) which is arranged to transmit angular drive in discrete steps, the rotor moving eccentrically in relation to the axis of the stator. Both the rotor and stator may carry cooperating gears. Permanent magnet detents are provided on the stator. The drive coupling may be a slide arrangement, a flexible bellows, or an eccentric cam. The control circuitry includes a pulsing arrangement, ring counter, inductive pickoffs, and a coincidence detector.

3,560,774

Inventor:
Raymond R. Reeves
By Baldwin Wight Diller & Brown
Attorneys

ROTARY STEPPING MOTOR WITH ECCENTRIC ROTOR

This invention relates to an electric stepping motor of the kind which can be used, for example, to drive the capstan of a paper tape reader as in computer peripheral equipment. Another use for such motors is to drive a punch mechanism to provide holes in a paper tape or again, for process and machine control systems.

According to the present invention an electric stepping motor comprises a stator with three or more circumferentially displaced poles and provided with a rotor which is arranged to transmit angular drive in discrete steps, the rotor moving eccentrically in relation to the axis of the stator.

The angular displacement of the drive transmitted may be the same as or less than the angular displacement between the poles between which the rotor moves from one step to the next.

Such a motor can be used for providing larger angular displacements than those in current use, for example, 15°or as much as 90°, although it can be used to provide small displacement such as 2°.

In one preferred embodiment the rotor is cylindrical and rolls around within a cylindrical bore in the stator. Thus, with this arrangement the relative diameters determine the amount of angular movement of the rotor between the poles and although the angular displacement might be 90° if there are, for example, four poles, angular movement of the rotor when moving from one pole to the next might be only 15°.

The stator may carry an internal toothed gear and the rotor an intermeshing external gear, and with this arrangement the gearing will be arranged to provide the necessary relationship.

In a preferred arrangement intermeshing gears are provided at each axially displaced end of the stator and rotor, which will thus reduce any torsional loadings in the rotor itself.

In another preferred embodiment the stator is cylindrical and the rotor has an internal bore which rolls around the external surface of the stator.

Intermeshing gears may again be provided between the stator and the rotor.

The rotor may be connected to drive means through a drive coupling provided with means for converting the eccentric movement of the rotor into rotary movement about a fixed axis.

In this arrangement one end of the rotor may be connected to an intermediate drive member through a first diametrically extending slide and the drive member is connected to a driven shaft through a second diametrically extending slide which extends in a direction normal to the first.

Alternatively the rotor may be connected to the driven shaft through a flexible bellows.

In another arrangement the rotor may drive a driven shaft which is coaxial with the axis of the stator through an eccentric cam carried in a bearing in the rotor.

In any case, the drive shaft may be arranged to extend axially through the rotor from one end to the other and each of the ends may be carried in bearings in a support assembly.

Preferably means are provided for holding the rotor in its stepped positions by means of a permanent magnet system.

With this arrangement each pole may be provided with an associated permanent magnet which is strong enough to hold the rotor in position when stationary but the attraction force of which is overcome when the appropriate next pole is energized.

If required each permanent magnet may be arranged to be energized with a DC voltage at the same time as its associated pole is energized to increase the hold torque of the permanent magnet system.

The invention also includes appropriate apparatus for delivering the required pulse to the poles of the motor to cause the stepped drive to the part which is being driven.

The invention may be performed in many ways and various embodiments will now be described by way of example and with reference to the accompanying drawings in which.

Figure 1:
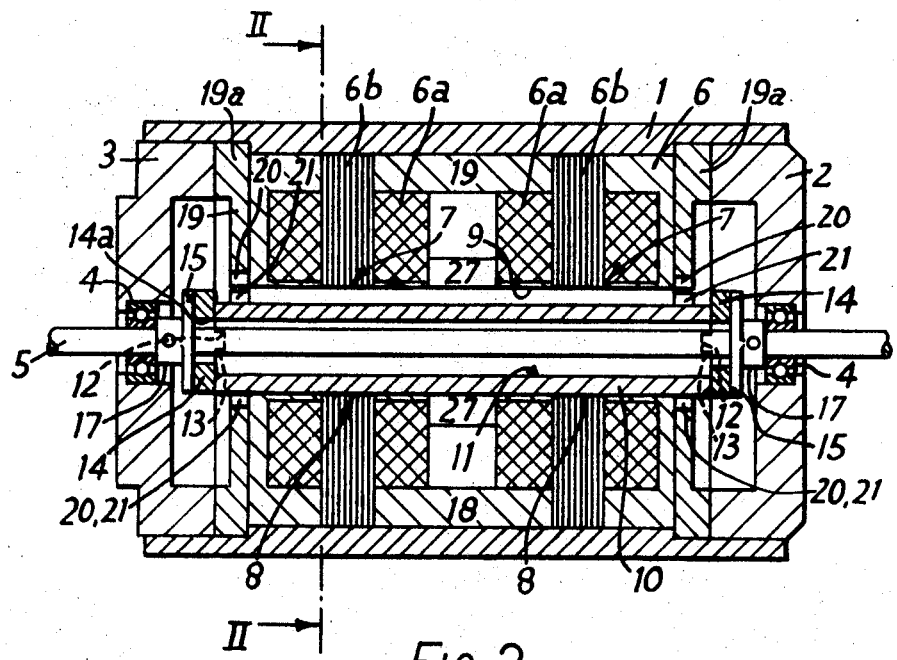
FIG. 1 is a cross-sectional side elevation of a stepping motor according to the invention.
Figure 2:
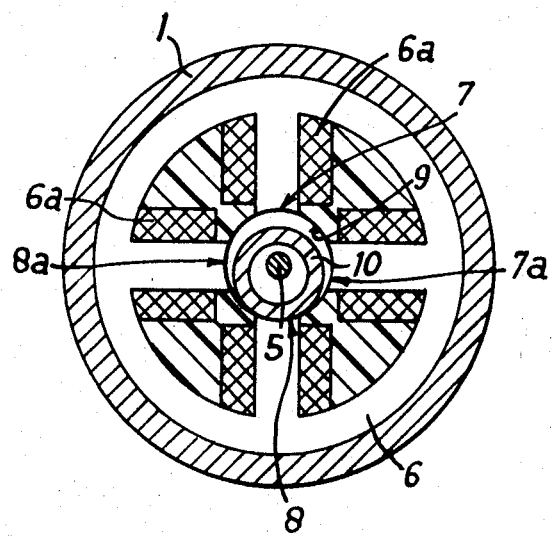
FIG. 2 is a cross-sectional view on the line II–II of FIG. 1.
Figure 3:
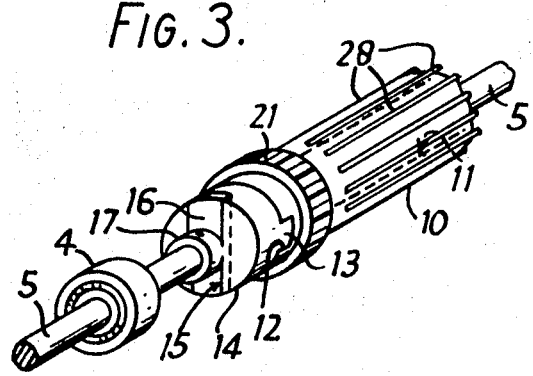
FIG. 3 is an isometric view of part of the drive coupling used in the construction shown in FIG. 1.

In the first embodiment to be described and as shown in FIGS. 1, 2 and 3 the stepping motor according to the invention is for use in a paper tape reader in which an angular movement of 15° is required on a driven capstan at a rate of up to 150 steps/sec.

The motor comprises a cylindrical outer casing 1 each and of which is closed by an end piece 2,3 which provides a support assembly and each of which carries a roller race 4 to support a driven shaft 5 which extends axially through the casing 1. Mounted within the casing is a cylindrical stator 6 the windings 6a of which are arranged to provide four circumferentially displaced poles indicated by reference numerals 7,7a and 8,8a in FIG 2, two sets of windings 6a being provided at each pole position. The stator 6 extends axially between the end piece 2,3 and an inner bore 9 provided by its cylindrical shape houses a hollow cylindrical rotor 10 made from soft Swedish iron. The driven shaft 5 passes through the inner bore 11 of the rotor 10 but is not connected to it. As is most clearly shown in FIG. 3 each end of the rotor is formed with a diametrically extending groove 12 which engages a cooperating diametrically extending dog 13 provided on one face of an intermediate disclike drive member 14 which has a large bore 14a. The reverse face of the drive member 14 is provided with a similar groove 15,15 but which is arranged at right angles to the dog 13 and this second groove 15 engages a diametrically extending dog 16 provided on a collar 17 which is rigidly connected to the driven shaft.

The rotor 10 is arranged to roll around the inner bore 9 of the stator 6 and its eccentric movement is transmitted to the driven shaft 5 which can only rotate about a fixed axis by the dogs 13 and 16, the relative out-of-center movement being accommodated by the dogs 13 and 16 sliding in the grooves 13 and 15.

Figure 7:
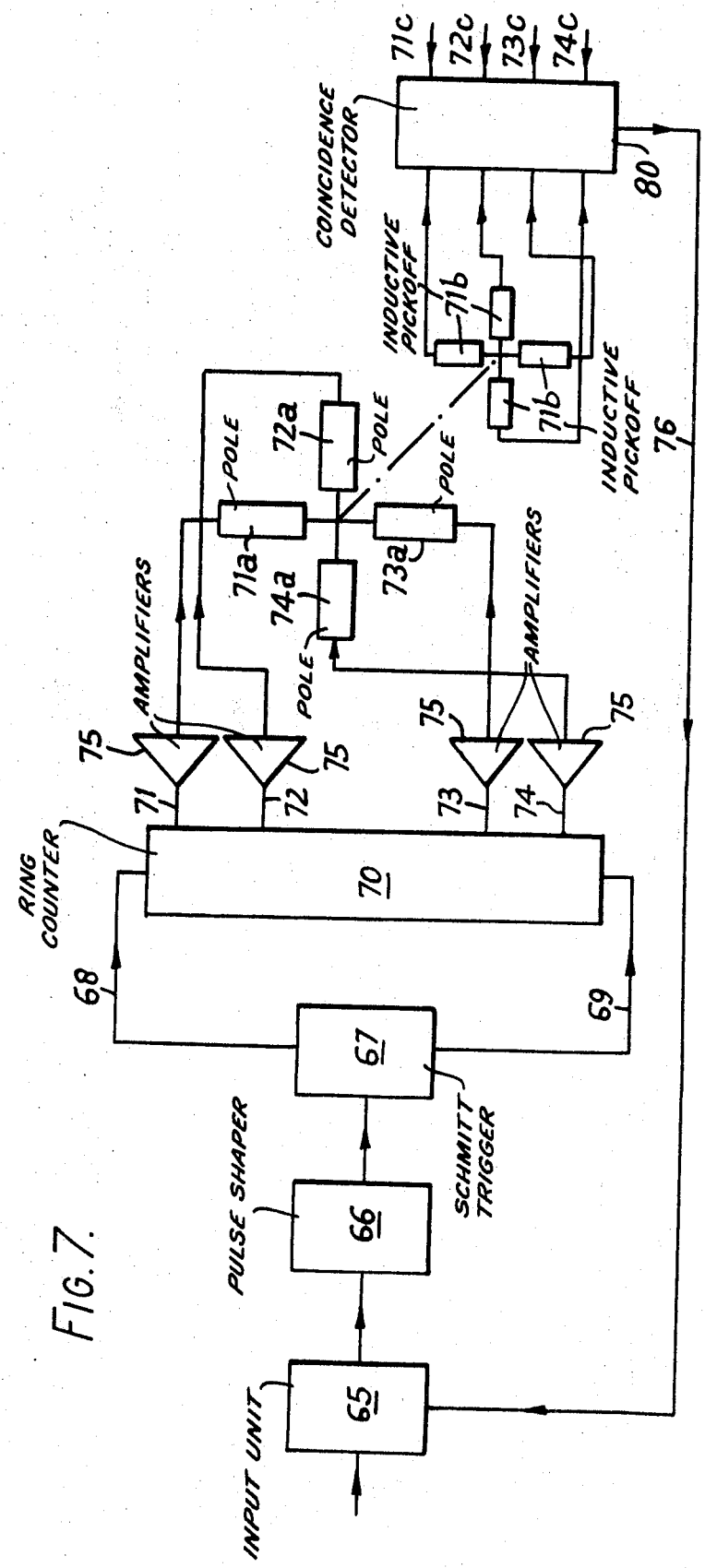
FIG. 7 is a block diagram of an electrical circuit for use with the stepping motor.

The poles indicated at 7 and 8 in the stator 6 are provided by electromagnets and four permanent magnets are also provided, two of which are shown at 18 and 19 in FIG. 1 and which are orientated so that their fields act through the stator poles 7,7a, 8,8a. Energizing means of any convenient kind, for example, as shown in FIG. 7, are provided to supply DC pulses in sequence successively to energize the electromagnets around the stator and in the direction of rotation of the rotor, the electromagnets providing the successive stator poles as required. Thus, the electromagnetic circuit passing from the rotor, through laminations 6b of one of the electromagnets across the associated permanent magnet and through the lamination 6b of the other electromagnet back to the rotor.

After the pulse the permanent magnets 18 or 19 act to hold the rotor 10 in one position to provide an accurate angular position for the driven shaft and in FIG. 1 the rotor is shown held by the pole 8. When the next pole 8a is energized by a suitable DC pulse the hold torque provided by the permanent magnet 18 is overcome and the pole pulse provides the energy to cause a dynamic step to occur, the rotor 10 rolling around the bore 9 of the stator 6 to the energized pole 8a where it is again held in a precise mechanical position by the associated permanent magnet (not shown in FIG. 2). If required a DC voltage could be applied to the pole against which the rotor 10 is held to add to or supplement the hold torque supplied by the appropriate permanent magnet. This additional DC voltage can therefore provide variation and control for the hold torque which must be overcome by the next pole to cause the rotor to move. Thus, additional inertia in the rotor 10 and mechanical load can be accommodated by the extra attraction force which is provided by the DC voltage on the windings associated with the permanent magnet in the hold torque position.

A brass or bronze plate 19a is provided at each end of the stator 6 and in which is a circular opening of similar dimension to the diameter of the bore 9 and provided with gear teeth 20. The outer circumference of the displaced ends of the rotor 10 are also provided with gear teeth 21 which mesh with the teeth 20 on the plates 14.

It will be appreciated that the amount of angular movement of the driven shaft 5 is dependent upon the relative diameters of the bore 9 and the rotor 10, or, when gears are provided the gear ratio between the internal gearing provided by the teeth 20, 21 on the ends of the stator and rotor and although the angular movement of the rotor around the inner bore of the stator is 90° the angular movement of the rotor and the drive shaft can be arranged to be exactly 15° by providing a suitable gear ratio although, because the diameter of the rotor is less than the diameter of the bore in the stator, the rotary movement transferred to the driven shaft 5 is opposite in direction to that of the rotor itself.

The approximate stepping production of the arrangement can be as low as plus or minus ½ and it has no cumulative error.

Figure 4:
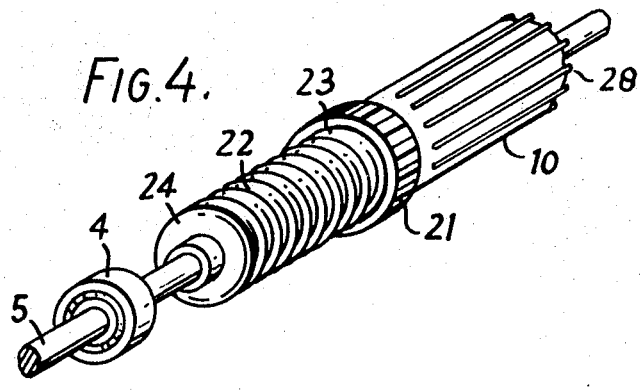
FIG. 4 is an isometric view of an alternative coupling.

In an alternative construction as shown in FIG. 4 the drive coupling at each end of the rotor which is provided by the intermediate drive member 14 and the dogs is replaced by a flexible bellows 22 one end 23 of which is rigidly secured to the rotor 10 the other end 24 being rigidly connected to the driven shaft 5. The bellows which can be made from any suitable material is strong enough to transmit the torque from the rotor 10 to the shaft 5, but its corrugations enable it to flex radially to accommodate the eccentric out of alignment between the rotor and the shaft as the angular movement of the rotor takes place.

Figure 5:
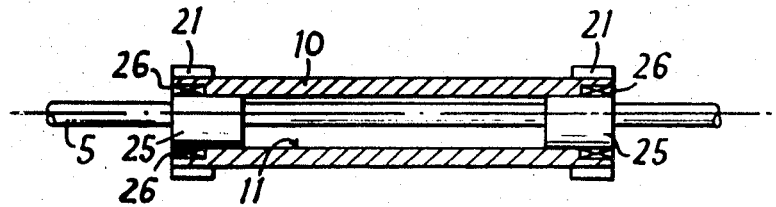
FIG. 5 is a cross-sectional view of an alternative rotor construction.

In another drive arrangement as shown in FIG. 5 and which can be used to provide an angular movement the driven shaft of 90° the same reference numerals are used to indicate similar parts. In this arrangement each end of the bore 11 of the hollow rotor 10 is closed by an eccentric cam 25 to which the driven shaft 5 is rigidly connected. The eccentric cams 25 are carried in needle roller bearings 26 coaxial with the axis of the rotor so that the shaft 5 is off center in relation thereto. The angular movement of the cams as the rotor 10 rolls around the stator bore 9 causes a relative angular movement of the shaft 5 about its axis which is of the same magnitude and in the same direction as the rotor. Thus the cams act to transmit the relative angular position of the rotor in the bore 9 to the shaft 5 on its fixed axis of rotation.

Means for electrically indicating the position of the rotor 10 are provided by inductive pickoffs indicated at 27 in FIG. 1. Thus, each time the rotor moves the pickoff is activated when the rotor reaches it, the pickoff operating in the manner described with reference to FIG. 7.

As shown in FIGS. 3 and 4 longitudinally extending copper bars 28 are carried in slots in the rotor 10 and are electrically connected together. The bars 28 act to dampen rotary movement of the rotor, especially against oscillation when the rotor moves to a pole and is effected by inertia due to the working load or its own mass.

External damping in the form of a pneumatic or hydraulic dashpot (not shown) can also in incorporated if desired.

Figure 6:
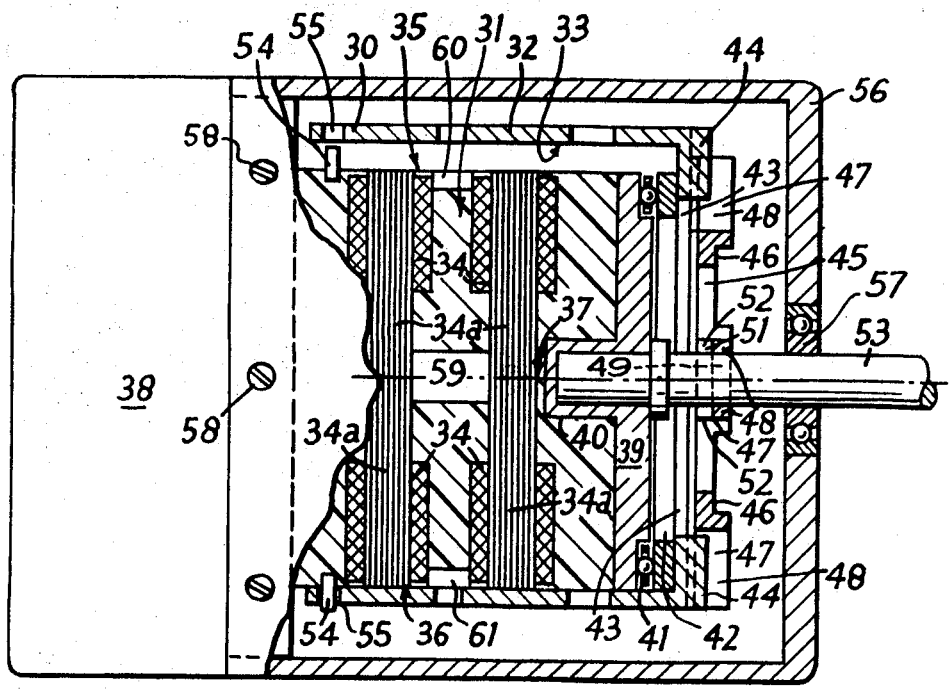
FIG. 6 is a cross-sectional side view of an alternative construction.

Another construction according to the invention is shown in FIG. 6. In this stepping motor the rotor 30 is carried outside a cylindrical stator 31, the rotor comprising a light cage 32 made from Swedish iron and having an internal bore 33. The stator is provided with two sets of windings 34 and laminations 34a to produce four poles at right angles to each other two of which are indicated at 35 and 36 and the position of a third being indicated at 37. One end of the stator is provided with a housing 38 and the other end with an end closure plate 39 which carries a socket bearing 40 which is coaxial with the axis of the stator. Carried on the closure plate 39 is a thrust race 41 against which rests a thrust washer 42. The adjacent end of the rotor cage 32 is provided with an inwardly extending flange 43 which bears against the washer 42 and the flange 43 has two radially extending dogs formed by raised portions 44 which are diametrically displaced from each other.

In order to transmit drive from the rotor a drive coupling member 45 is provided which is in the form of a washer having four radially projecting arms 46 each of which is cut out at 47 to provide a slide with parallel walls 48. The coupling member is carried on the rotor cage 32 so that two of the cutouts 47 are aligned with the dogs 44, the parallel walls 48 acting as guides for cooperating surfaces on the dogs 44. The other cutouts 47 which are at right angles to the two referred to above are engaged by a diametrically extending drive arm 49 one side of which is provided with projecting parallel sided dogs 51 which project into the cutouts 47 and the sides 52 of which engage the cooperating parallel walls 48. The drive arm 49 is rigidly secured to a driven shaft 53 the end of which is carried in the socket bearing 40.

If required gearing can be provided between the rotor and stator and in the construction shown this is provided by a ring of radially projecting pins 54 on the stator which engage a ring of cooperating openings 55 in the rotor cage 32.

A cover 56 is arranged to protect the rotor and this is provided with a steady bearing 57 for the shaft 53 and is held in place on the housing 38 by screws 58.

In this construction a single permanent magnet 59 is provided which operates at each pole through the laminations 34a to hold the rotor in position after the operating DC pulse. The operating electromagnetic circuit at any pole is therefore from the rotor through one of the laminations to the permanent magnet 59 and back to the rotor through the other lamination. Inductive pickups to indicate the movement of the rotor are again provided two being indicated at 60 and 61.

When the stator is energized to produce the poles successively the rotor follows the poles in a somewhat similar fashion to the constructions described with reference to FIGS. 1 and 2 but in this case the rotor rolls around the stator. The slides and dogs on the rotor and coupling member enable the eccentric rotational movement of the rotor to be imparted to the driven shaft 53 which rotates about a fixed axis, the difference in diameter between the rotor bore and the stator again causing the driven shaft 53 to rotate through a smaller angle than the angle moved about the stator by the rotor between the poles and because the rotor bore is greater than the stator diameter the direction of rotation is the same. In FIG. 6 the rotor 30 is shown in position at pole 36 and it will be seen that it is there therefore close to the stator at this point, the other side of the rotor being spaced away from it. The eccentric displacement is accommodated by the dogs 44 sliding in the cutouts 47 in the coupling member 45. When the rotor moves to the next pole 37 the eccentric movement will be accommodated by the movement between the cutouts in the coupling member and the dogs 51 on the drive arm 49, so that the eccentric movement of the rotor is converted into a rotary movement of the drive shaft 53.

FIG. 7 is a block diagram of a circuit which can be used with the stepping motors described above. A series of input pulses to drive the motor are obtained from a computer or similar device and are delivered to an input unit 65, from here the pulse is sharpened by a pulse shaper 66 such as a schmitt trigger circuit and delivered to a FORWARD or REVERSE device 67 which is operated by an appropriate electric signal from, for example the computer and which may be in the form of a special pulse. The signal is then fed via "forward" line 68, or reverse line 69 to ring counter 70 which acts to divide the series of pulses into four secondary trains which are applied to the lines 71, 72, 73, 74 sequentially. Thus of four pulses entering the ring counter in sequence from forward line 68 the first will be directed to line 71, the second to line 72, the third to line 73 and the fourth to line 74, or in the reverse order if they enter from the reverse line 69. Each line 71, 72, 73, 74 includes an amplifier 75 from which it leads to the electromagnet associated with one of the poles 71a, 72a, 73a, and 74a, in the stepping motor. In the arrangement shown the poles are energized in a clockwise direction from the "forward" line 68 and in an anticlockwise direction from the reverse line 69.

Associated with each pole in the motor and arranged close thereto is an inductive pickoff, which is indicated by the reference numerals 71*b*, 72*b*, 73*b*, 74*b*, the pickoff 71*b* being associated with pole 71*a*, 72*b* with 72*a*, 73*b* with 73*a* and 74*b* with 74*a*. The pickoffs are connected to a coincidence detector 80 to which signals from the ring counter indicated by arrows 71*c*, 72*c*, 73*c*, 74*c* are also delivered in sequence with corresponding signals to the lines 71—74. Thus the movement of the rotor which operates the pickoffs will be compared with the signals from the ring counter and the result transmitted to the input via line and the input can be arranged to be switched off.

I claim:

1. An electric stepping motor comprising a rigid rotor, a stator including field generating means which provide a number of poles circumferentially displaced around an axis and adapted for deflecting the rotor to produce an annular movement thereof in discrete steps in relation to said axis, means for stopping the rotor at each pole, said rotor having an eccentric movement and rolling in relation to said stator, an output shaft which revolves about a fixed axis coaxial with the first said axis, and coupling means connecting said output shaft to said rotor for converting said eccentric movement of said rotor to rotational movement of said output shaft about said fixed axis in the same direction and with the same angular displacement as the rotor about its own axis.

2. An electric stepping motor as claimed in claim 1 in which the rotor is cylindrical, is positioned within and rolls around within a cylindrical bore in the stator.

3. An electric stepping motor as claimed in claim 2 in which the stator carries at least one internal toothed gear and the rotor carries at least one intermeshing external gear meshed with the first said gear.

4. An electric stepping motor as claimed in claim 3 in which said at least one internal gear and said at least one external gear comprise intermeshing gears provided at each axially displaced end of the stator and rotor.

5. An electric stepping motor as claimed in claim 1 in which the stator is cylindrical and the rotor has an internal bore, is positioned about and rolls around the external surface of the stator.

6. An electric stepping motor as claimed in claim 5 in which intermeshing gears are provided between the stator and rotor.

7. An electric stepping motor as claimed in claim 6 in which said gears are provided by a series of radially projecting pins on the stator which engage a series of circumferentially spaced openings in the rotor.

8. An electric stepping motor as claimed in claim 1 in which the coupling means comprises an intermediate drive member connected to one end of the rotor through a first diametrically extending slide, and the drive member is connected to a driven shaft through a second diametrically extending slide extending in a direction normal to the first.

9. An electric stepping motor as claimed in claim 1 in which the coupling means comprise a flexible bellows.

10. An electric stepping motor as claimed in claim 1 in which the coupling means comprise a shaft which is coaxial with the axis of the stator through an eccentric cam carried in a bearing in the rotor, and which is driven by the rotor.

11. An electric stepping motor as claimed in claim 10 in which the drive shaft extends axially through the rotor from one end to the other.

12. An electric stepping motor as claimed in claim 11 in which each end of the drive shaft is carried in bearings in a support assembly.

13. An electric stepping motor as claimed in claim 11 in which means including a permanent magnet system are provided for holding the rotor in its stepped positions.

14. An electric stepping motor as claimed in claim 13 in which each pole is provided with an associated permanent magnet which is strong enough to hold the rotor in position when stationary but the attraction force of which is overcome when the appropriate next pole is energized.

15. An electric stepping motor as claimed in claim 14 including means for energizing each permanent magnet with a DC voltage at the same time as its associated pole is energized to increase the hold torque of the permanent magnet system.

16. An electric stepping motor as claimed in claim 1 including means for providing a signal indicative that the rotor has stepped.

17. An electric stepping motor as claimed in claim 16 in which the means for providing a signal comprise an inductive pickoff arranged at each pole.